INVENTOR.
HENRY MARTIN HUGE

Sept. 4, 1945.   H. M. HUGE   2,384,171
FREQUENCY CHANGER
Filed Oct. 9, 1943   2 Sheets-Sheet 2

INVENTOR.
HENRY MARTIN HUGE
BY
ATTORNEYS.

Patented Sept. 4, 1945

2,384,171

UNITED STATES PATENT OFFICE 2,384,171

FREQUENCY CHANGER

Henry Martin Huge, Lorain, Ohio, assignor of one-half to E. M. Heavens and one-half to Closman P. Stocker Application October 9, 1943, Serial No. 505,611

13 Claims. (Cl. 172—281)

This invention relates to frequency changers and in particular to a frequency-changing transformer capable of generating subharmonics of the input frequency. The subject matter of this application is an extension of the invention shown and described in my copending application Serial No. 485,834, filed May 6, 1943, now Patent No. 2,364,532 dated Dec. 5, 1944.

It is an object of this invention to generate subharmonics of the input frequency in a static frequency changer.

Another object of this invention is to produce a frequency-changing transformer for the generation of subharmonics.

Another object of this invention is to produce a subharmonic generator of high efficiency and stability.

Still another object of this invention is to automatically start subharmonic oscillations by means of a relay.

Other objects and a better understanding of my invention may be had by referring to the following specification and claims together with the accompanying drawings, in which:

Figure 1:
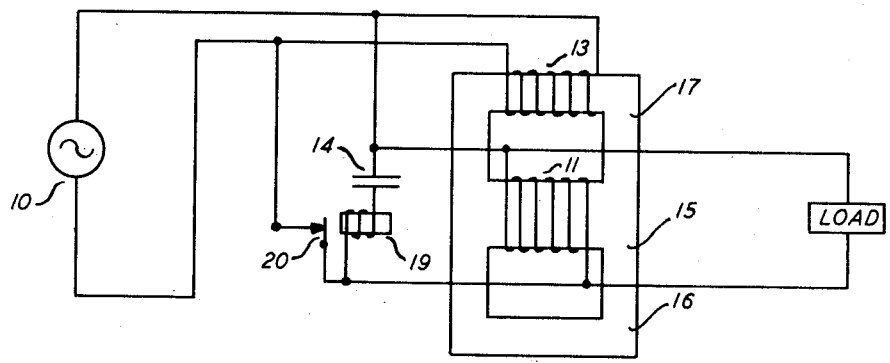
Figure 1 shows diagrammatically a subharmonic generator made according to my invention, with a three-legged saturable magnetic core.

With more particular reference to Figure 1, there is shown a magnetic core structure having three members, 15, 16, and 17. Winding 13 on member 17 is energized from source 10.

When the power from source 10 is first applied, the normally-closed relay contacts 20 supply voltage to capacitor 14. The current through capacitor 14 and relay winding 19 operates the relay and opens contacts 20. The charge on capacitor 14 when the relay contacts open flows off through winding 11 on core member 15, magnetizing the core and starting the subharmonic oscillations through winding 11 and capacitor 14. The subharmonic current through capacitor 14 and relay winding 19 holds open the relay contacts 20 as long as the oscillations continue, but, should they stop, the relay releases, closing contacts 20 and restarting the oscillations.

In operation, the flux through core member 17 is mostly of the frequency of source 10, because winding 13 is connected directly to the source. Because capacitor 14 has a low impedance at the frequency of source 10, it tends to keep flux of that frequency out of core member 15 and most of the flux through 17 is driven to member 16 for its return path. Thus core member 16 acts as a saturable leakage reactance between the primary winding 13 and the secondary winding 11. Since source 10 normally has a low impedance to the subharmonic frequency, most of the subharmonic flux through member 15 is also driven to member 16 for its return path. Thus the subharmonic flux flows around through core members 15 and 16 and the energizing flux flows around through members 16 and 17. The superposition of fluxes in member 16 saturates this core member and thereby sustains and stabilizes the subharmonic oscillations. It may be desirable to increase the starting voltage upon capacitor 14. This may be done by connecting the starting contact on relay 19 to a tap (not shown) on winding 11. This will provide a step-up in voltage supplied to condenser 14 during the starting condition.

The load in Figure 1 is shown connected directly across winding 11, and may be supplied with voltage which is predominantly subharmonic with a relatively small component of the frequency of source 10. The output frequency most easily produced is one-third the input frequency, but other subharmonics can also be produced when the elements are suitably proportioned.

Figure 2:
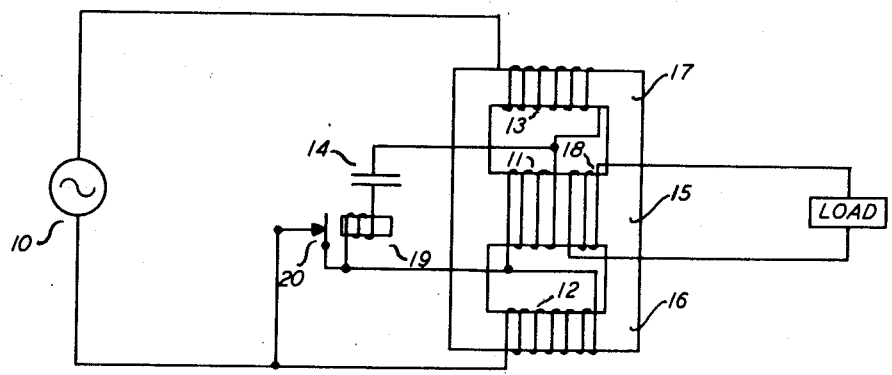
Figure 2 is a modification of the arrangement of Figure 1 with windings on all three of the core members.

Figure 2 shows a modification of the arrangement of Figure 1, with winding 12 added on core member 16 and connected in series with windings 11 and 13. If windings 11, 12, and 13 all have substantially the same number of turns, the energizing arrangement of Figure 2 may become substantially equivalent to that of Figure 1. The truth of this statement becomes evident when it is observed that when windings 11 and 12 are polarized in the same direction, they can produce in core member 17 substantially the same effect as that produced by winding 13, so that the change from Figure 1 to Figure 2 in this case consists of taking half of winding 13 in Figure 1 and replacing it by windings 11 and 12 in series in Figure 2. In addition, Figure 2 has an insulated output winding 18 on core member 15 to supply the subharmonic power to the load. Furthermore, relay contacts 20 in Figure 2 are connected across winding 12, but the effect is as in Figure 1, i. e. the closed contacts apply voltage from source 10 to capacitor 14.

It is not necessary to make windings 11, 12, and 13 in Figure 2 all equal; in fact, I have found that improved operation can be obtained by making winding 11 with fewer turns than either winding 12 or winding 13, particularly when core member 15 has a larger cross-sectional area than either member 16 or 17. With this arrangement, part of the subharmonic flux flows through core member 17. Since core member 16 is normally saturated, this arrangement increases the subharmonic flux density in core member 15, thereby making better use of this core member. Furthermore, since the conversion of power from the input frequency to the subharmonic frequency can occur only in a core member in which the fluxes of the two frequencies are superimposed, the addition of the subharmonic flux in core member 17 produces an added advantage. I have also found that as the number of turns on winding 11 is reduced, the turns on windings 12 and 13 may also be reduced somewhat without increasing the input current to the transformer. With the subharmonic flux flowing through both core members 16 and 17 and with primary windings on all three legs of the core, it is no longer clearly evident that there is a saturable leakage reactance between the primary windings and the secondary (or capacitor) winding, although in effect this is still true.

Figure 3:
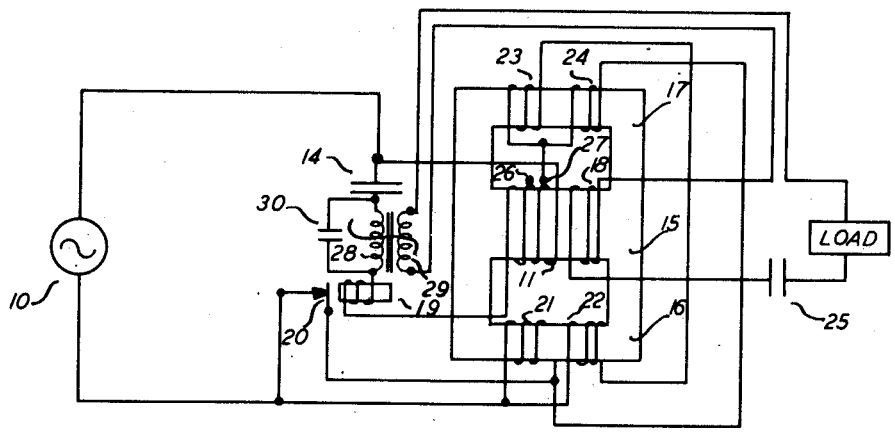
Figure 3 is a modification of the arrangement of Figure 2, with paralleled windings, an overload protection capacitor, and a saturable inductance for introducing harmonics in the subharmonic output voltage.

With the circuit shown in Figure 2, capacitor 14 may have applied to it a relatively low voltage and the design may not be economical because of the large capacity required. This difficulty is overcome by putting more turns on winding 11 and providing the winding with taps for the primary circuit as is shown in Figure 3. This figure also shows several other modifications, one being a double winding arrangement to facilitate operation on either of two input voltages. The connection shown is for the lower input voltage, with windings 21 and 24 in series, windings 22 and 23 in series and the two series combinations connected in parallel and connected to terminal 27 on winding 11. For operation on twice this voltage, windings 21, 24, 22, and 23 are connected in series and connected to terminal 26 on winding 11. The operation is substantially the same on either the high or the low input voltage.

The relay contacts 20 in Figure 3 are connected across winding 21 on core member 16. When the power from source 10 is first applied, the shorted winding keeps most of the flux out of core member 16, driving it through the center member 15, where it induces voltage across capacitor 14. The current through capacitor 14 and relay winding 19 opens the relay contacts 20. The charge which is on capacitor 14 when the relay contacts open then flows off through winding 11, magnetizing the core and causing subharmonic oscillations to start in the circuit of winding 11. The subharmonic current through relay winding 19 keeps the contacts 20 open as long as the oscillations continue, if they stop the relay releases and restarts the oscillations.

Figure 3 shows an arrangement for introducing high order harmonics into the output voltage. These harmonics are frequently required when the converter is used to supply telephone ringing current, in which case the audible components of the output voltage may be fed back to the calling subscriber's receiver to let him hear when the bell of the called subscriber is being rung. The audible components of the pure ringing voltage supplied by the converters of Figures 1 and 2 are usually too weak for this purpose so the saturable inductance having windings 28 and 29 is added in the circuit of Figure 3, together with capacitor 30. Saturable inductance winding 28 in series with capacitor 14 is energized with subharmonic current which, because of the saturation of the magnetic core, generates high order harmonics in the voltage across windings 28 and 29. Capacitor 30 in parallel with winding 28 accentuates the desired harmonics and winding 29 is connected in series with output winding 18. This combination is more fully described in my patent application of May 8, 1942, Serial No. 442,224, now pending.

Capacitor 25 in series with the output winding 18 acts as an overload protective device. When the load current becomes excessive, capacitor 25 drops the load voltage and insures that the subharmonic oscillations will not be stopped by overloads. This protection prevents excessive use of the relay, since the relay releases each time the oscillations stop and thereby restarts them.

Figure 4:
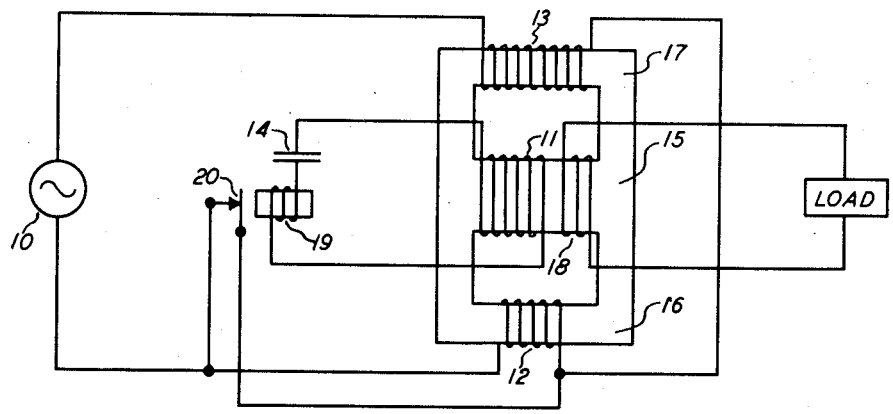
Figure 4 is another modification of the arrangement of Figure 2, in which the input is applied to two of the core members.

Figure 4 shows another modification of the circuit of Figure 2, in which the primary windings are placed on only the two outer core members 16 and 17. This arrangement can be made to produce substantially the same results as produced by the arrangement of Figure 2. In the circuit of Figure 4, I prefer to make winding 12 with fewer turns than winding 13, thus producing an unsymmetrical magnetization of the core as is produced in Figure 2 by the action of winding 11 in series with windings 12 and 13.

The windings 12 and 13 in Figure 4 may be made substantially equal but in this case I prefer to make one of the core members 16 and 17 smaller in cross sectional area or otherwise magnetically dissimilar to the other, so that an unbalanced condition exists, producing an externally applied magnetomotive force of the source frequency across core member 15. Actually, very little flux of the source frequency flows through 15, since it is stopped by the action of the low-impedance capacitor 14, which readily passes current of the source frequency to produce a counter-magnetomotive force of the source frequency. I have found that the unbalanced condition is essential to stability of operation, and that when insufficient unbalance is present the frequency of the output voltage may change under variations of load current. The unbalanced condition is characterized by the current of the source frequency which it induces in capacitor 14, even though this current produces little voltage across the capacitor. In all the arrangements shown, there is relatively more subharmonic flux in member 16 than in 17. In particular, in the arrangement of Figure 1 there is practically no subharmonic flux in member 17.

The operation of the transformer of Figure 4 is similar to that described in connection with Figure 2. The flux through core member 15 is predominantly subharmonic flux, and it circulates through both of the outer members 16 and 17 on its return path but does not divide equally between them. The ratio between the amounts of subharmonic flux through core members 16 and 17 depends on the relative number of turns on windings 12 and 13 in Figure 4. The flux of the frequency of source 10 circulates chiefly through core members 16 and 17, inducing in windings 12 and 13 voltages which add together, their sum being substantially equal to the voltage of source 10. In this description source 10 is considered as being a generator of low internal impedance so that the voltage appearing across it is influenced only slightly by the current through windings 12 and 13, and will include very little subharmonic voltage. In this case the subharmonic flux through core member 17 produces a subharmonic voltage which substantially cancels that induced in winding 12 by the subharmonic flux in member 16.

As with the arrangements of Figures 1, 2, and 3, the circuit of Figure 4 is best adapted to supply the load with power at a frequency which is one-third the frequency of source 10, but other frequencies can be supplied with the circuit elements suitably proportioned.

Figure 5:
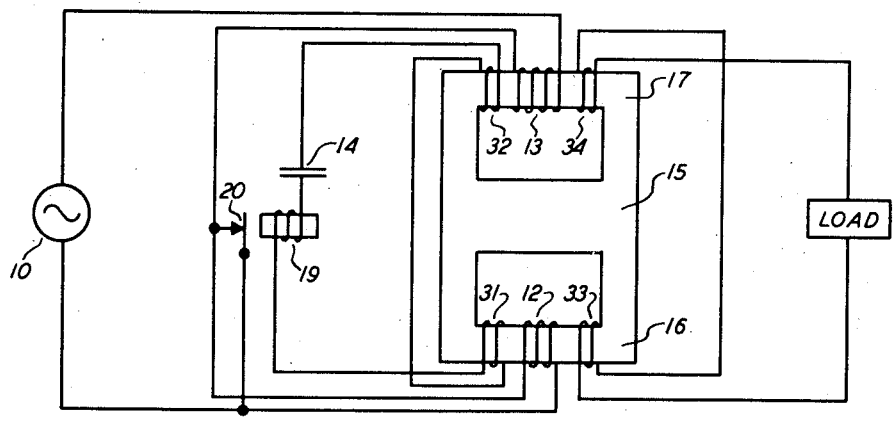
Figure 5 shows a further modification of my invention using a common magnetic core. With this construction the unit may be made in two separate and distinct pieces each piece including the windings shown on one member of Fig. 5.

Figure 5 shows another modification of my frequency changer in which all the windings are placed on two of the three core members. Winding 11 of the previous figures is replaced by windings 31 and 32 and output winding 18 by windings 33 and 34. With the arrangement of Figure 5 the operation of the frequency changer of Figure 4 may be substantially duplicated, but it is also possible to modify some of the operating conditions. For example, in the arrangements of Figures 1 to 4 there is relatively little flux of the input frequency through member 15, but in Figure 5 if windings 31 and 32 are dissimilar, there may be appreciable flux of the input frequency through member 15. This does not imply that there is any fundamental difference between the operation of the arrangement of Figure 5 and that obtainable with the arrangements of Figures 1 to 4, since the same essential features are present in all the arrangements. These features are, the primary winding or windings for energizing the saturable core from the alternating current source, the secondary winding or windings connected to the capacitor for sustaining the subharmonic oscillations and the unbalanced core or winding arrangement which effectively provides a saturable leakage reactance between primary and secondary.

To confirm the presence of the saturable leakage reactance between primary and secondary in any of the arrangements pictured, it is well to consider the nature of the secondary current when the secondary is short-circuited. In the arrangement of Figure 1 it is apparent that the short-circuit current in winding 11 will be just that which is required to magnetize core member 16, therefore when the primary voltage is relatively low, very little secondary current will flow, as it will require little force to magnetize 16 at the low flux density but if the primary voltage is increased until the member 16 begins to saturate, the secondary current will increase to the value necessary to magnetize 16 at the high flux density.

In Figure 2 it is apparent that if secondary winding 11 is shorted by an ammeter, the meter will carry the same exciting current as windings 12 and 13 and the current will therefore exhibit the same rapid increase at high voltage as experienced with the arrangement of Figure 1, and it can be said that there is effectively a saturable leakage reactance between the primary and the secondary in Figure 2. In this respect Figure 3 is similar to Figure 2.

The arrangement of Figure 4 is somewhat similar to that of Figure 1 except that core member 16 already has part of its magnetizing force supplied by winding 12 so that the short-circuit current of winding 11 need only supply the remainder, but the saturation effect will be in evidence as before. If the structure is perfectly balanced, however, there will be no short-circuit current in winding 11, therefore it will no longer be correct to state that a saturable leakage reactance exists between primary and secondary, but, as previously stated, my invention does not contemplate the use of a perfectly balanced structure.

The characteristics of the arrangement of Figure 5 parallel those of Figure 4, even when primary flux is caused to flow in all three core members.

It is to be understood that the drawings are diagrammatic in nature and do not necessarily represent the proportions of the magnetic core or windings thereon.

Although I have described my invention with a certain degree of particularity, it is to be understood that the present disclosure has been made only by way of example, and that numerous changes in the details of construction and the combination and arrangement of parts may be resorted to without departing from the spirit and scope of the invention as hereinafter claimed.

I claim as my invention:

1. A subharmonic generator comprising in combination a magnetic core having a plurality of core members, a first winding on one of said members adapted to be energized by a source of alternating current, a second winding on another of said members, a capacitor connected across said second winding, and a relay having normally closed contacts connecting said capacitor to said first winding to supply energy from the source of alternating current to the capacitor when the relay contacts are closed, said relay being adapted to be energized with subharmonic current.

2. A frequency reducer comprising in combination a magnetic core having a plurality of core members, a first winding on one of said core members adapted to be energized by a source of alternating current, a second winding on another of said core memers, a capacitor connected across said second winding, a relay adapted to be energized with current of the reduced frequency, said second winding being adapted to be energized at the frequency of said source until said relay operates, and then energized at the reduced frequency.

3. A subharmonic generator adapted to be energized by a source of alternating current and to supply a load with power at a subharmonic frequency, comprising in combination a magnetic core having first, second, and third core members, windings on said first and second core members adapted to be energized by the source of alternating current, a winding on said third core member, a capacitor connected across said winding on the third core member, and a relay adapted to supply an intitial charge to said capacitor to start subharmonic oscillations through the capacitor.

4. A subharmonic generator comprising in combination magnetic core means having at least three core members, primary winding means on the core means adapted to be energized by a source of alternating current, secondary winding means on the core means, capacitive means connected across the secondary winding means, and starting means comprising a relay adapted to produce a starting transient in the secondary winding means to initiate subharmonic oscillations therein, said primary and secondary winding means being disposed on at least two of the core members and having effectively a saturable leakage reactance between them.

5. A subharmonic generator comprising in combination, magnetic core means having at least three core members, primary winding means on the core means adapted to be energized by a source of alternating current, secondary winding means on the core means, capacitive means energized by the secondary winding means, starting means adapted to produce a starting transient to initiate subharmonic oscillations through the capacitive means, and output winding means inductively related to the secondary winding means, said winding means being disposed on at least two of the core members with an effective saturable leakage reactance between the primary and secondary winding means.

6. A frequency reducer comprising in combination a magnetic core having first, second, and third core members, the first and second core members having substantially the same magnetic characteristics, first and second substantially equal windings respectively on said first and second core members adapted to be energized from a source of alternating current and to produce opposing fluxes in the third core member, a third winding on the third core member, a capacitor adapted to be energized from said third winding, at least a portion of the third winding being adapted to be energized from the source in series with the first winding, and starting means adapted to initiate oscillations of the reduced frequency in the third winding means.

7. A frequency reducer comprising in combination a magnetic core having first, second, and third core members, the first and second core members having substantially the same magnetic characteristics, first and second substantially equal windings respectively on said first and second core members adapted to be energized from a source of alternating current and to produce opposing fluxes in the third core member, a third winding on the third core member, a capacitor adapted to be energized from said third winding, at least a portion of the third winding being adapted to be energized from the source in series with the first winding, starting means adapted to initiate oscillations of the reduced frequency in the third winding means and an output circuit for supplying the reduced frequency to a load.

8. A frequency reducing arrangement comprising in combination a magnetic core having first, second, and third core members with first, second, and third windings respectively thereon, the first, second, and third windings being connected in series and adapted to be energized by an alternating current source, a capacitor adapted to be energized from the third winding, a starting relay adapted to produce an initial charge on the capacitor to initiate oscillations of the reduced frequency through it, and an output circuit for supplying the reduced frequency to a load.

9. A subharmonic generator comprising in combination a magnetic core having first, second, and third core members, first and second unequal windings on the first and second core members respectively, said first and second windings being connected in series and adapted to be energized by an alternating current source and to produce opposing fluxes in the third core member, a third winding on the third core member, a capacitor connected across the third winding for supporting subharmonic oscillations therein, an output winding on the third core member and a starting relay having normally closed contacts shunting at least a portion of the first winding.

10. A subharmonic generator comprising in combination a magnetic core having first, second, and third core members, the first and second core members being magnetically dissimilar, first and second windings on the first and second core members respectively, said first and second windings being connected in series and adapted to be energized by a source of alternating current and to produce opposing fluxes in the third core member, a third winding on the third core member, a capacitor connected across the third winding for supporting subharmonic oscillations therein, an output winding on the third core member, and a starting relay having normally closed contacts shunting at least a portion of the first winding.

11. A subharmonic generator comprising in combination a saturable magnetic core having first, second, and third core members, a primary circuit comprising windings on the first and second core members connected in series and adapted to be energized by a source of alternating current and to produce opposing fluxes in the third core member, a secondary circuit comprising windings on the first and second core members connected in series opposition with respect to said primary windings, a capacitor connected across the secondary circuit, a relay adapted to produce a starting transient to initiate subharmonic oscillations in the secondary circuit, and an output circuit inductively related to said secondary circuit.

12. A subharmonic generator comprising in combination a saturable magnetic core having first, second, and third core members, a primary circuit comprising windings on the first and second core members connected in series and adapted to be energized by a source of alternating current and to produce opposing fluxes in the third core member, a secondary circuit comprising windings on the first and second core members connected in unbalanced series opposition with respect to said primary windings, a capacitor connected across the secondary circuit, a relay adapted to produce a starting transient to initiate subharmonic oscillations in the secondary circuit, and an output circuit inductively related to said secondary circuit.

13. A subharmonic generator comprising in combination, first and second saturable magnetic flux paths, a primary circuit comprising windings on the first and second flux paths, connected in series and adapted to be energized by a source of alternating current, a secondary circuit comprising windings on the first and second flux paths connected in unbalanced series opposition with respect to said primary windings, a capacitor connected across the secondary circuit, a relay adapted to produce a starting transient to initiate subharmonic oscillations in the secondary circuit, and an output circuit inductively related to said secondary circuit.

HENRY MARTIN HUGE.